United States Patent
Xu (10) Patent No.: US 10,254,377 B2
(45) Date of Patent: Apr. 9, 2019

(54) REFRIGERATOR AND POSITIONING DEVICE THEREOF

(71) Applicants: HEFEI MIDEA INTELLIGENT TECHNOLOGIES CO., LTD., Hefei (CN); HEFEI HUALING CO., LTD., Hefei (CN); MIDEA GROUP CO., LTD., Foshan (CN)

(72) Inventor: Da Xu, Hefei (CN)

(73) Assignees: HEFEI MIDEA INTELLIGENT TECHNOLOGIES CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/835,485

(22) Filed: Dec. 8, 2017

(65) Prior Publication Data

US 2018/0356489 A1  Dec. 13, 2018

(51) Int. Cl.
| | |
|---|---|
| H04Q 5/22 | (2006.01) |
| G01S 5/02 | (2010.01) |
| G06K 7/00 | (2006.01) |
| G06K 7/10 | (2006.01) |

(52) U.S. Cl.
CPC .......... *G01S 5/0221* (2013.01); *G06K 7/0008* (2013.01); *G06K 7/10009* (2013.01)

(58) Field of Classification Search
None
See application file for complete search history.

(56) References Cited

U.S. PATENT DOCUMENTS

| | | | | |
|---|---|---|---|---|
| 7,644,017 | B2 * | 1/2010 | Pippia | F25D 29/00 |
| | | | | 235/382 |
| 7,808,366 | B2 * | 10/2010 | Son | F25D 29/005 |
| | | | | 340/10.1 |
| 8,502,645 | B2 * | 8/2013 | Thomas | F25D 29/00 |
| | | | | 340/10.1 |

(Continued)

FOREIGN PATENT DOCUMENTS

| | | |
|---|---|---|
| CN | 101641929 A | 2/2010 |
| CN | 201935518 U | 8/2011 |

(Continued)

OTHER PUBLICATIONS

Chinese Office Action dated Jan. 31, 2018 in the corresponding Chinese application(application No. 201610527268.X).

*Primary Examiner* — Tuan A Tran
(74) *Attorney, Agent, or Firm* — Kilpatrick Townsend & Stockton LLP (57) ABSTRACT

A refrigerator and a positioning device for a refrigerator are provided. The positioning device includes: a wave absorbing component disposed in the refrigerator and configured to absorb a radio frequency (RF) signal emitted from an RF tag in the refrigerator; a plurality of reading components disposed in the refrigerator and configured to receive an RF signal passing through the wave absorbing component; an intensity detecting module configured to detect an intensity of the RF signal received by each of the plurality of reading components; and a positioning module configured to determine a location of the RF tag according to the intensity of the RF signal received by each of the plurality of reading components.

10 Claims, 3 Drawing Sheets

(56) References Cited

U.S. PATENT DOCUMENTS

| | | | | |
|---|---|---|---|---|
| 8,912,910 B2* | 12/2014 | Lee | ................... | G06Q 10/087 |
| | | | | 235/385 |
| 9,449,208 B2* | 9/2016 | Luk | ................... | F25D 29/005 |
| 9,784,497 B2* | 10/2017 | Wang | ................... | F25D 29/00 |
| 9,982,938 B2* | 5/2018 | Tae | ................... | F25D 29/00 |
| 2006/0145814 A1* | 7/2006 | Son | ................... | F25D 29/005 |
| | | | | 340/10.1 |
| 2007/0150381 A1* | 6/2007 | Pippia | ................... | F25D 29/00 |
| | | | | 705/28 |
| 2013/0049967 A1* | 2/2013 | Lee | ................... | G06Q 10/087 |
| | | | | 340/585 |
| 2016/0162715 A1* | 6/2016 | Luk | ................... | F25D 29/005 |
| | | | | 235/385 |

FOREIGN PATENT DOCUMENTS

| | | |
|---|---|---|
| CN | 104113352 A | 10/2014 |
| CN | 104751206 A | 7/2015 |
| CN | 104850874 A | 8/2015 |

* cited by examiner

REFRIGERATOR AND POSITIONING DEVICE THEREOF

FIELD

The present disclosure relates to the field of electric appliances, and more particularly to a positioning device for a refrigerator and a refrigerator.

BACKGROUND

As intelligence of refrigerator becomes higher and higher, more and more refrigerators use radio frequency identification (RFID) technology to identify food in the refrigerator. An identifying method adopted in the related art is to place the food and an electronic tag with corresponding food information into the refrigerator simultaneously, identify the tag in the refrigerator by a card reader module, record the identified shelf life of the food, and judge whether the food is expired, thus achieving the purpose of intelligent reminder. By applying the RFID technology in the refrigerator environment, good results in terms of accuracy and identification rate of tag identification may be achieved.

However, problems existing in the related art are that the food contained in the refrigerator cannot be positioned, that is, it is impossible to determine whether the food is placed in a refrigerating compartment or a freezing compartment, thus resulting in the food to deteriorate easily. For example, perishable meats intended to be cooked is put by the user into the refrigerator compartment, but is forget by the user because of other things, because the refrigerator cannot accurately determine that the meat is placed in the refrigerator compartment, and thus will not remind the user, thereby resulting in deterioration of the food, and further causing the user to consider that the so-called intelligence refrigerator is not intelligent.

SUMMARY

Embodiments of the present disclosure seek to solve at least one of the problems existing in the related art to at least some extent. Therefore, an objective of the present disclosure is to provide a positioning device for a refrigerator, which may position an RE tag accurately, thereby improving intelligence of the refrigerator.

Another objective of the present disclosure is to provide a refrigerator.

In order to realize the above objectives, an embodiment of a first aspect of the present disclosure provides a positioning device for a refrigerator, including: a wave absorbing component disposed in the refrigerator and configured to absorb a radio frequency (RF) signal emitted from an RF tag in the refrigerator; a plurality of reading components disposed in the refrigerator and configured to receive an RF signal passing through the wave absorbing component; an intensity detecting module configured to detect an intensity of the RF signal received by each of the plurality of reading components; and a positioning module configured to determine a location of the RF tag according to the intensity of the RF signal received by each of the plurality of reading components.

With the positioning device for the refrigerator provided in an embodiment of the present disclosure, the RF signal emitted from the RF tag in the refrigerator is absorbed by the wave absorbing component, the RF signal passing through the wave absorbing component is received by the plurality of reading components, and then the intensity of the RF signal received by each of the plurality of reading components is detected by the intensity detecting module, the location of the RF tag is determined by the positioning module according to the intensity of the RF signal received by each of the plurality of reading components. Therefore, relative locations of the RF tag to the plurality of reading components are determined according to the intensities of the RF signal read by the plurality of reading components, according to which the location of the RF tag is further determined, so as to position the food and remind the user of the shelf life of food more accurately, thereby improving intelligence of the refrigerator. Moreover, the wave absorbing component absorbs the RE signal, such that the attenuation of the RF signal radiated by the RF tag to the plurality of reading components increases, thus improving accuracy for positioning the RF tag, and reflection and refraction of electromagnetic wave in the refrigerator compartments are effectively restrained, thereby reducing signal attenuation and signal enhancement due to multipath interference and improving identification rate of the RF tag.

In an embodiment of the present disclosure, the wave absorbing component includes a wave absorbing material attached to an outer side of an inner liner of each compartments in the refrigerator.

In an embodiment of the present disclosure, the RF tag is configured to radiate the RF signal after receiving a reading signal emitted from at least one of the plurality of reading components.

In an embodiment of the present disclosure, each of the plurality of reading components includes an RF antenna.

In an embodiment of the present disclosure, the plurality of reading components include a first reading component disposed in a refrigerating compartment of the refrigerator and a second reading component disposed in a freezing compartment of the refrigerator. Further, the plurality of reading components further include a third reading component disposed in a temperature changing compartment of the refrigerator.

Therefore, relative locations of the RF tag to the first to third reading components are determined according to the intensities of the RF signals read by the first to third reading components, according to which the compartment in which the RF tag is located is determined accurately, so as to position the food and remind the user of the shelf life of the food more accurately, thereby improving intelligence of the refrigerator.

In an embodiment of the present disclosure, the intensity detecting module includes a plurality of intensity detecting units corresponding to the plurality of reading components, each of the plurality of intensity detecting units includes: a differential transforming unit configured to perform a balance-unbalance conversion on the RF signal received by a corresponding reading component to generate a first differential signal and a second differential signal; a first processing unit configured to process the first differential signal to generate a first intensity value; and a second processing unit configured to process the second differential signal to generate a second intensity value orthogonal to the first intensity value; the positioning module is configured to calculate the intensity of the RF signal received by the corresponding reading component according to the first intensity value and the second intensity value, In an embodiment of the present disclosure, the first processing unit includes a first mixer configured to perform frequency conversion on the first differential signal to convert the first differential signal into a first baseband signal, a first amplifying and filtering element configured to amplify and filter the first baseband signal, and a first analog-to-digital converter configured to perform analog-to-digital conversion on the first baseband signal amplified and filtered to generate the first intensity value; and the second processing unit includes a second mixer configured to perform frequency conversion on the second differential signal to convert the second differential signal into a second baseband signal, a second amplifying and filtering element configured to amplify and filter the second baseband signal, and a second analog-to-digital converter configured to perform analog-to-digital conversion on the second baseband signal amplified and filtered to generate the second intensity value.

In an embodiment of the present disclosure, the positioning module calculates the intensity of the RF signal received by the corresponding reading component according to following formulas:

$$RFIN\_I'=20 \log_{10}(RSSII)-GAIN\_I$$

$$RFIN\_Q'=20 \log_{10}(RSSIQ)-GAIN\_Q$$

$$RFIN\_I''=10^{ORFIN\_I'/20}$$

$$RFIN\_Q''=10^{(RFIN\_Q'/20)}$$

$$RFIN=[(RFIN\_I'')+(RFIN\_Q'')^2]^{1/2}$$

$$RSSI=20 \log_{10}(RFIN)$$

where RSSI is the intensity of the RF signal, RSSII is the first intensity value, and RSSIQ is the second intensity value.

In order to realize the above objectives, an embodiment of a second aspect of the present disclosure provides a refrigerator including the positioning device as described above.

With the refrigerator provided in embodiments of the present disclosure, the food is positioned by the positioning device thereof, and it is possible to remind the user of the shelf life of the food more accurately and improve intelligence of the refrigerator.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A brief introduction of the application of RFID technology in the refrigerator is described as follows.

In the related art, the RFID technology is mainly used for tag identification in the refrigerator, i.e., used for identifying the tag in the refrigerator and recording the shelf life of food identified, and judging simultaneously whether the food is out of date so as to realize the purpose of intelligent reminder.

However, the present inventor has found and recognized that it is difficult to position an RF tag through an RF signal due to characteristics of the RF signal itself, an antenna, space environment, and the like. The three main reasons are as follows.

Firstly, short-distance attenuation of an electromagnetic wave in the atmospheric environment is very small, and AD (analog-to-digital) sampling to such an accurate extent is difficult to achieve, so that accurate positioning by RF signal is always difficult to realize.

Secondly, most of RFID antennas take a circular polarization mode, such polarization mode may increase an identification range of the tag and reduce a problem of a decrease in an identification rate caused by a placement manner of the tag. However, it also leads to a problem at the same time that it is difficult to acquire location information according to the relative locations of the tag to the antenna because the electromagnetic waves radiated by the antenna and the tag will distribute within the whole compartments.

Thirdly, the refrigerator body is a closed space, in which there are a variety of metal parts, glass parts and plastic parts, the environment is very complex, multipath interference is very serious, and the electromagnetic waves radiated by the antenna and the tag will be refracted, reflected, diffracted, thereby increasing the difficulty of collecting and analyzing RF signals.

Based on this, a refrigerator and a positioning device for the refrigerator are provided by the present disclosure.

The refrigerator and the positioning device for the refrigerator according to embodiments of the present disclosure will be described below with reference to the accompanying drawings.

Figure 1:
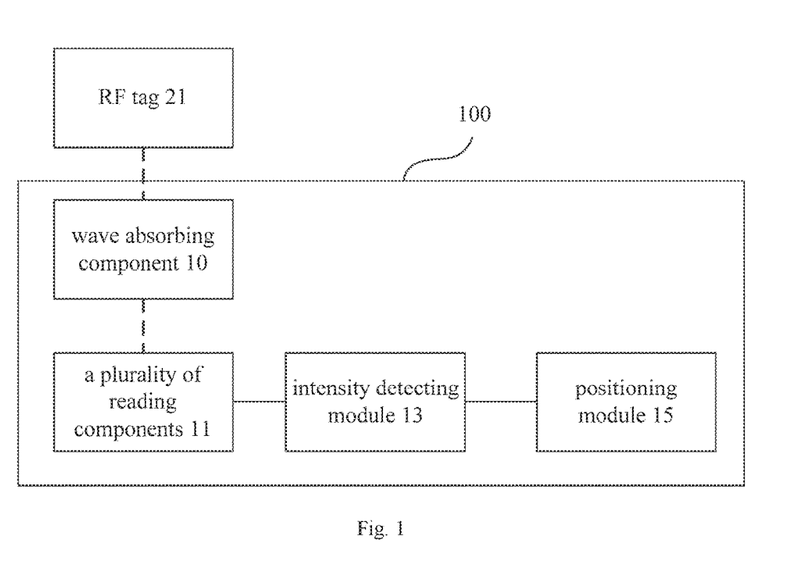
FIG. 1 is a block diagram of a positioning device for a refrigerator according to an embodiment of the present disclosure.

FIG. 1 is a block diagram of a positioning device for a refrigerator according to an embodiment of the present disclosure. As shown in FIG. 1, the positioning device 100 includes a wave absorbing component 10, a plurality of reading components 11, an intensity detecting module 13, and a positioning module 15.

The wave absorbing component 10 is disposed in the refrigerator and configured to absorb an RF signal emitted from an RF tag in the refrigerator. The plurality of reading components 11 are disposed in the refrigerator and configured to receive an RF signal passing through the wave absorbing component 10. The intensity detecting module 13 is configured to detect an intensity of the RF signal received by each of the plurality of reading components. The positioning module 15 is configured to determine a location of the RF tag 21 according to the intensity of the RF signal received by each of the plurality of reading components.

According to a specific embodiment of the present disclosure, each of the plurality of reading components includes an RF antenna and receives the RF signals passing through the wave absorbing component 10 through its own antenna.

Specifically, a user may put the food and an RF tag 21 written with the corresponding food information into the refrigerator simultaneously. When positioning the food, the RF tag 21 radiates RF signals outward, intensities of the RF signals received by the plurality of reading components 11 at different locations are different, the RF signals radiated by the RF tag 21 attenuates after absorbed by the absorbing component 10, the intensities of the RF signals received by each of the plurality of the reading components are detected by the intensity detecting module 13 and compared by the positioning module 15, such that the location of the RF tag 21 is positioned. For example, the intensities of the RF signals received by the plurality of reading components 11 are compared, and the RF tag 21 is close to the reading component by which the RF signals are received in the maximal intensity.

In addition, in an embodiment of the present disclosure, the intensities of the RF signals from different locations of the refrigerator and received by each of the plurality of the reading components may be detected through multiple experiments, such that intensity ranges of the RF signals from different locations of the refrigerator and received by each of the plurality of the reading components are further determined to form an intensity range-location table. The intensity range-location table is pre-stored in the positioning module 15, such that after the intensities of the RF signals received by each of the plurality of the reading components are detected by the intensity detecting module 13, the positioning module 15 compares the intensities of the RF signals received by the plurality of reading components 11 with the intensity range-location table to position the RF tag 21. For example, if it is determined through comparison and analysis that the intensities of the RF signals received by the plurality of reading components 11 are within a corresponding intensity range in the intensity range-location table, a location corresponding to the intensity range is the location of the RF tag 21.

Further, according to an embodiment of the present disclosure, the intensity of the RF signal received by each reading component may be detected multiple times by the intensity detecting module 13, so that the location of the RF tag 21 is positioned by the positioning module 15 according to the intensity detected for multiple times of the RF signal received by each reading components, thus improving accuracy of the positioning.

In addition, in an embodiment of the present disclosure, the RF signal received by each of the plurality of the reading components is an attenuated RF signal. It should be rioted that, for wireless signal transmission technology, such as zigbee, wifi, bluetooth, RFID and so on, the transmission distance is relatively short, for example, RFID RF tag may be identified in the range of 1-2 m. In such a small space, attenuation of the electromagnetic waves is extremely weak, and such weak attenuation is difficult to be distinguished in view of AD sampling and quantization accuracy. Even if the sampling and the quantization accuracy of the AD conversion may meet the requirements, multipath effect of the electromagnetic waves is very obvious in the closed environment of the refrigerator, multipath enhancement and multipath attenuation caused by the multipath effect will result in irregular intensity of the RF signal.

Therefore, in an embodiment of the present disclosure, the attenuation of the RF signals radiated by the RF tag 21 to the plurality of reading components 11 is increased by the wave absorbing component 10, the RF signals attenuated by the wave absorbing component 10 are simultaneously received by the plurality of reading components 11 disposed in spatial diversity, and intensities of the RF signals received by the plurality of reading components 11 are analyzed so as to realize the positioning of the RF tag 21. Simultaneously, the reflection and refraction of the electromagnetic waves in the compartments may be restrained effectively by the wave absorbing component 10, thereby reducing the signal attenuation and signal enhancement caused by multipath effect, and improving identification rate of the tag.

Figure 2:
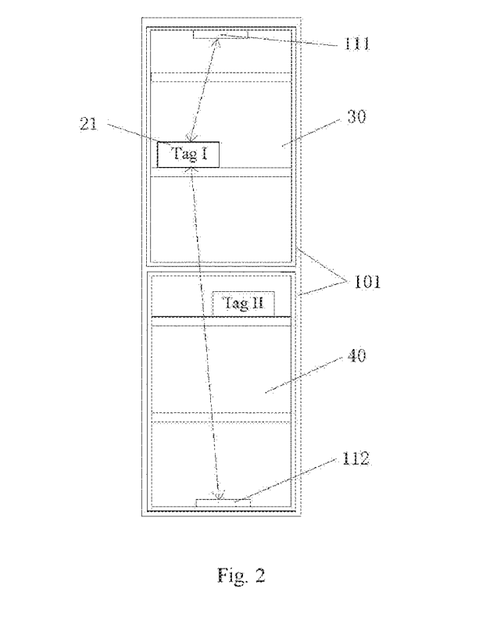
FIG. 2 is a schematic diagram of a positioning device for a refrigerator according to an embodiment of the present disclosure.

According to an embodiment of the present disclosure, as shown in FIG. 2, the wave absorbing component 10 includes a wave absorbing material 101 attached to an outer side of an inner liner of each compartment in the refrigerator, and the wave absorbing material 101 is configure to absorb the RF signal to increase the attenuation of the RF signal, for example, an absorbing effect of the wave absorbing material 101 in the 900 MHz band may reach about 25 dB. Specifically, the wave absorbing material 101 may be a soft wave absorbing material.

According to an embodiment of the present disclosure, the RF tag 21 is configured to radiate the RF signal after receiving a reading signal emitted from at least one of the plurality of reading components 11.

Specifically, the plurality of reading components 11 radiate outward the RF signal with a positioning instruction after receiving the positioning instruction, and the RF tag 21 enters an activated state after receiving the positioning instruction emitted from the reading components. After the RF tag 21 is activated, its own encoding information is modulated through the AD conversion to a predetermined frequency, e.g., 925 MHz, and then is radiated outward through an antenna on the RF tag 21.

Therefore, the type of the wave absorbing material 101 may be selected according to the frequency of the RF signal emitted from the RF tag 21, or the frequency of the RF signal emitted from the RF tag 21 may be adjusted according to the type of the wave absorbing material 101, i.e., the signal band absorbable by the wave absorbing material 101.

An operating principle of the positioning device 100 according to embodiments of the present disclosure is described below by taking FIG. 2 and FIG. 3 as examples.

According to a specific embodiment of the present disclosure, as shown in FIG. 2, the refrigerator may include a refrigerating compartment 30 and a freezing compartment 40. In addition, in other embodiments of the present disclosure, as shown in FIG. 3, the refrigerator may further include a temperature changing compartment 50. The positioning module 15 may position the compartment at which the RF tag 21 is located according to the intensity of the RF signal received by each of the plurality of the reading components.

As shown in FIG. 2 and. FIG. 3, the soft wave absorbing material 101 may be attached to the outer side of the inner liner of each of the refrigerating compartment 30, the freezing compartment 40 and the temperature changing compartment 50.

As shown in FIG. 2, the plurality of reading components 11 may include a first reading component 111 disposed in the refrigerating compartment 30 of the refrigerator and a second reading component 112 disposed in the freezing compartment 40 of the refrigerator. In a specific embodiment of the present disclosure, the first reading component 111 may be disposed at the top of the refrigerating compartment 30 and the second reading component 112 may be disposed at the bottom of the freezing compartment 40.

Figure 3:
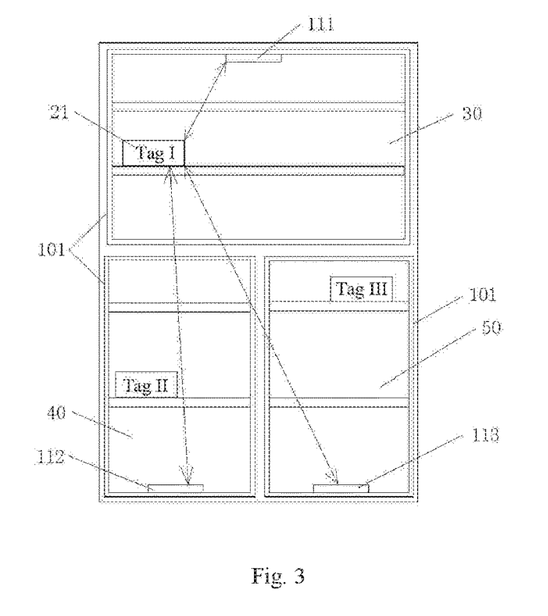
FIG. 3 is a schematic diagram of a positioning device for a refrigerator according to another embodiment of the present disclosure.

As shown in FIG. 3, the plurality of reading components 11 further include a third reading component 113 disposed in the temperature changing compartment 50 of the refrigerator. In a specific embodiment of the present disclosure, the third reading component 113 may be disposed at the bottom of the temperature changing compartment 50.

Therefore, one reading component is installed in each of the refrigerating compartment 30, the freezing compartment 40, and the temperature changing compartment 50 respectively. The RF signals emitted from the same RF tag 21 are read by the reading components in different compartments, and the relative locations of the RF tag 21 to each of the plurality of the reading components is judged according to the intensities of the RF signals so as to judge the food is placed in the freezing compartment or the freezing compartment or the temperature changing compartment of the refrigerator, thus realizing the purpose of food positioning.

Since the inner liner of each compartment is attached with the absorbing material which can achieve an attenuation of 25 dB, there is a significant difference in the intensities of the RF signals received by the reading component in each compartment. In this way, the intensities of the RF signals received by each of the plurality of the reading components are detected by the intensity detecting module 13 for multiple times, e.g., five times, and values obtained in multiple detections are analyzed, such that the compartment where the RF tag 21 is located may be clearly determined.

Illustration is made by taking tag I in FIG. 3 as an example.

RF signals are radiated by the tag I after the tag I receives the positioning instruction, and are transmitted to the first reading component 111, the second reading component 112 and the third reading component 113 through the soft wave absorbing material 101 attached to the refrigerating compartment 30, the freezing compartment 40 and the temperature changing compartment 50. The intensities of the RF signals received by the first reading component 111, the second reading component 112 and the third reading component 113 have significant differences due to the attenuation of the wave absorbing material. The intensities of the RF signals received by the first reading component 11 and the second reading component 112 and the third reading component 113 are detected by the detecting module 13 respectively. The compartment at which the RF tag 21 is located is positioned by the positioning module 15 according to the intensities of the RF signals.

For example, the intensities of the RF signals received by the first reading component 111, the second reading component 112 and the third reading component 113 from the tag I are shown in table 1 below

TABLE 1

| detection times | reading component 111 | reading component 112 | reading component 113 |
|---|---|---|---|
| Tag I 1 | −57 dBm | −73 dBm | −77 dBm |
| 2 | −55 dBm | −70 dBm | −79 dBm |
| 3 | −56 dBm | −74 dBm | −78 dBm |
| 4 | −57 dBm | −75 dBm | −80 dBm |
| 5 | −60 dBm | −75 dBm | −79 dBm |

It can be seen from Table 1 above that, the signal intensity received by the first reading component 111 is significantly higher than that received by the second reading component 112 and the third reading component 113, so that it can be determined that the tag is located in the refrigerating compartment 30. Meanwhile, as the signal intensity received by the second reading component 112 is slightly higher than that received by the third reading component 113, the tag I may be located at the left side of the refrigerator near the second reading component 112, such that the compartment at which the tag I is located is determined. In addition, it should be understood that, the location of the tag I may be acquired more accurately by analyzing more data.

Therefore, the compartment where the RF tag is located is accurately determined by determining the relative locations of the RF tag to the first to third reading components according to the intensities of the RF signals read by the first to third reading components, so as to position the food and remind the user of the shelf life of the food more accurately, thereby improving intelligence of the refrigerator.

Further, according to an embodiment of the present disclosure, the intensity detecting module 13 includes a plurality of intensity detecting units corresponding to the plurality of reading components 11. For example, the intensity detecting module 13 may include: a first intensity detecting unit configured to detect the intensity of the RF signal received by the first reading component 111; a second intensity detecting unit configured to detect the intensity of the RF signal received by the second reading component 112; and the third intensity detecting unit configured to detect the intensity of the RF signal received by the third reading component 113.

Figure 4:
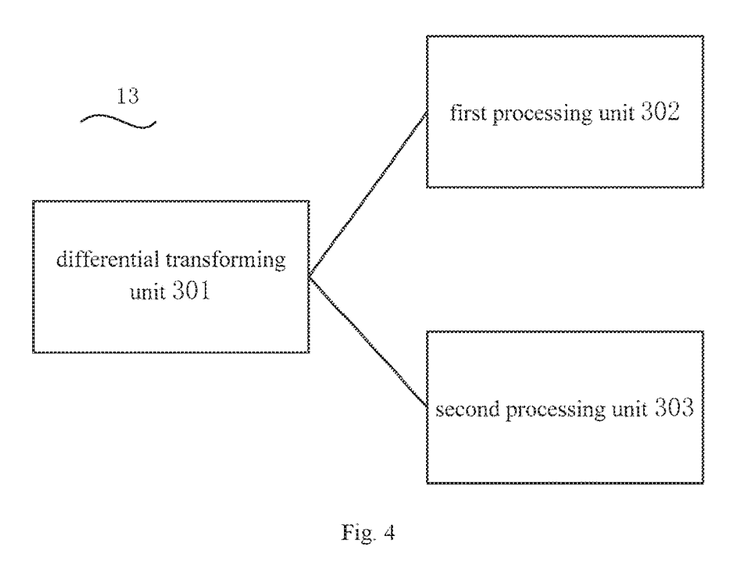
FIG. 4 is a block diagram of an intensity detecting module according to an embodiment of the present disclosure.

As shown in FIG. 4, each of the intensity detecting units includes a differential transforming unit 301, a first processing unit 302, and a second processing unit 303.

The differential transforming unit 301 is configured to perform a balance-unbalance conversion on the RF signal RFIN received by a corresponding reading component to generate a first differential signal and a second differential signal. The first processing unit 302 is configured to process the first differential signal to generate a first intensity value. The second processing unit 303 is configured to process the second differential signal to generate a second intensity value orthogonal to the first intensity value.

The positioning module 15 is configured to calculate the intensity of the RF signal received by the corresponding reading component according to the first intensity value and the second intensity value.

Figure 5:
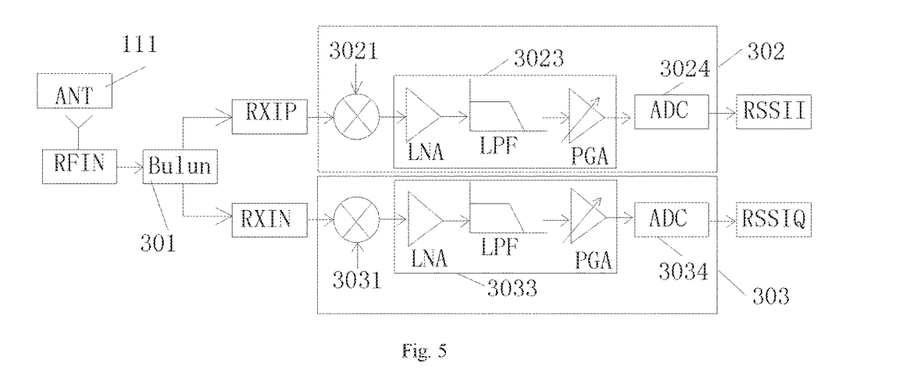
FIG. 5 is a schematic diagram of an intensity detecting module according to a specific embodiment of the present disclosure.

Specifically, as shown in FIG. 5, the first processing unit 302 includes a first mixer 3021 configured to perform frequency conversion on the first differential signal to convert the first differential signal into a first baseband signal, a first amplifying and filtering element 3023 configured to amplify and filter the first baseband signal, and a first analog-to-digital converter 3024 configured to perform analog-to-digital conversion on the first baseband signal amplified and filtered to generate the first intensity value; and the second processing unit 303 includes a second mixer 3031 configured to perform frequency conversion on the second differential signal to convert the second differential signal into a second baseband signal, a second amplifying and filtering element 3033 configured to amplify and filter the second baseband signal, and a second analog-to-digital converter 3034 configured to perform analog-to-digital conversion on the second baseband signal amplified and filtered to generate the second intensity value.

In a specific embodiment of the present disclosure, the differential transforming unit 301 includes a Balun device. Each of the first amplifying and filtering element 3023 and the second amplifying and filtering element 3033 may include a low-noise amplifier (LNA), a low-pass filter (LPF) and a programmable gain amplifier (PGA) connected in sequence.

That is to say, after the RF signal RFIN emitted from the RF tag 21 is received by the antenna of any of the reading components in the refrigerator, the RF signal RFIN is converted by the Balun device through the balance-imbalance conversion into a first differential signal RXIP and a second differential signal RXIN, the first differential signal RXIP is converted by the first mixer 3021 through the frequency conversion into a first baseband signal the first baseband signal is amplified and filtered through LNA, LPF and PGA, and then is converted by the first analog-to-digital converter 3024 through the analog-to-digital conversion to output a first intensity value RSSII; similarly, the second differential signal RXIN is converted by the second mixer 3031 through the frequency conversion into a second baseband signal, the second baseband signal is amplified and filtered through LNA, LPF and PGA, and then is converted by the second analog-to-digital converter 3034 through the analog-to-digital conversion to output a second intensity value RSSIQ. Thus, a set of orthogonal intensity values RSSII and RSSIQ are output by the intensity detecting unit finally.

As a result, the intensity detecting module 13 amplifies the received weak signal and filters out noises, thereby improving the signal-to-noise ratio, and increasing the accuracy of AD sampling.

Specifically, the positioning module 15 calculates the intensity of the RF signal received by the corresponding reading component according to the following formulas:

$$RFIN\_I'=20\ \log_{10}(RSSII)-GAIN\_I$$

$$RFIN\_Q'=20\ \log_{10}(RSSIQ)-GAIN\_Q$$

$$RFIN\_I''=10^{(RFIN\_I'/20)}$$

$$RFIN\_Q''=10^{(RFIN\_Q'/20)}$$

$$RFIN=[(RFIN\_I'')^2+(RFIN\_Q'')^2]^{1/2}$$

$$RSSI=20\ \log_{10}(RFIN)$$

where RSSI is the intensity of the RF signal, RSSII is the first intensity value, and RSSIQ is the second intensity value.

That is, the intensity of the RF signal received by the corresponding reading component can be calculated by the positioning module 15 according to the first intensity value RSSII and the second intensity value RSSIQ, so as to be used to further determine the location of the RF tag 21.

To sum up, with the positioning device for the refrigerator provided in an embodiment of the present disclosure, the RF signal emitted from the RF tag in the refrigerator is absorbed by the wave absorbing component, the RF signal passing through the wave absorbing component is received by the plurality of reading components, and then the intensity of the RF signal received by each of the plurality of reading components is detected by the intensity detecting module, and the location of the RF tag is determined by the positioning module according to the intensity of the RF signal received by each of the plurality of reading components. Therefore, relative locations of the RF tag to the plurality of reading components are determined according to the intensities of the RF signal read by the plurality of reading components, according to which the location of the RF tag is further determined, so as to position the food and remind the user of the shelf life of the food more accurately, thereby improving intelligence of the refrigerator. Moreover, the wave absorbing component absorbs the RF signal, such that the attenuation of the RF signal radiated by the RF tag to the plurality of reading components increases, thus improving accuracy for positioning the RF tag, and reflection and refraction of electromagnetic wave in the refrigerator compartments are effectively restrained, thereby reducing signal attenuation and signal enhancement due to multipath interference and improving identification rate of the RF tag.

Finally, according to an embodiment of the present disclosure, a refrigerator including the positioning device as described in the above embodiments is further provided.

With the refrigerator provided in embodiments of the present disclosure, the food is positioned by the positioning device thereof, and it is possible to remind the user of the shelf life of the food more accurately and improve intelligence of the refrigerator.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise" "axial," "radial," and "circumferential" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the phrase of "a plurality of" means two or more than two, for example, two or three, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features described in different embodiments or examples.

Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A positioning device for a refrigerator, comprising:
a wave absorbing component disposed in the refrigerator and configured to absorb a radio frequency RF signal emitted from an RF tag in the refrigerator;
a plurality of reading components disposed in the refrigerator and configured to receive an RF signal passing through the wave absorbing component;
an intensity detecting module configured to detect an intensity of the RF signal received by each of the plurality of reading components; and
a positioning module configured to determine a location of the RF tag according to the intensity of the RF signal received by each of the plurality of reading components.

2. The positioning device according to claim 1, wherein the wave absorbing component comprises a wave absorbing material attached to an outer side of an inner liner of each compartment in the refrigerator.

3. The positioning device according to claim 1, wherein the RF tag is configured to radiate the RF signal after receiving a reading signal emitted from at least one of the plurality of reading components.

4. The positioning device according to claim 1, wherein each of the plurality of reading components comprises an RF antenna.

5. The positioning device according to claim 1, wherein the plurality of reading components comprise a first reading component disposed in a refrigerating compartment of the refrigerator and a second reading component disposed in a freezing compartment of the refrigerator.

6. The positioning device according to claim 5, wherein the plurality of reading components further comprise a third reading component disposed in a temperature changing compartment of the refrigerator.

7. The positioning device according to claim 1, wherein the intensity detecting module comprises a plurality of intensity detecting units corresponding to the plurality of reading components, each of the plurality of intensity detecting units comprises:
a differential transforming unit configured to perform a balance-unbalance conversion on the RF signal received by a corresponding reading component to generate a first differential signal and a second differential signal;
a first processing unit configured to process the first differential signal to generate a first intensity value; and
a second processing unit configured to process the second differential signal to generate a second intensity value orthogonal to the first intensity value;
wherein the positioning module is configured to calculate the intensity of the RF signal received by the corresponding reading component according to the first intensity value and the second intensity value.

8. The positioning device according to claim 7, wherein the first processing unit comprises a first mixer configured to perform frequency conversion on the first differential signal to convert the first differential signal into a first baseband signal, a first amplifying and filtering element configured to amplify and filter the first baseband signal, and a first analog-to-digital converter configured to perform analog-to-digital conversion on the first baseband signal amplified and filtered to generate the first intensity value; and
the second processing unit comprises a second mixer configured to perform frequency conversion on the second differential signal to convert the second differential signal into a second baseband signal, a second amplifying and filtering element configured to amplify and filter the second baseband signal, and a second analog-to-digital converter configured to perform analog-to-digital conversion on the second baseband signal amplified and filtered to generate the second intensity value.

9. The positioning device according to claim 7, wherein the positioning module calculates the intensity of the RF signal received by the corresponding reading component according to following formulas:

$$RFIN\_I' = 20 \log_{10}(RSSII) - GAIN\_I$$

$$RFIN\_Q' = 20 \log_{10}(RSSIQ) - GAIN\_Q$$

$$RFIN\_I'' = 10^{(RFIN\_I'/20)}$$

$$RFIN\_Q'' = 10^{(RFIN\_Q'/20)}$$

$$RFIN = [(RFIN\_I'')^2 + (RFIN\_Q'')^2]^{1/2}$$

$$RSSI = 20 \log_{10}(RFIN)$$

where RSSI is the intensity of the RF signal, RSSII is the first intensity value, and RSSIQ is the second intensity value.

10. A refrigerator comprising a positioning device, comprising:
a wave absorbing component disposed in the refrigerator and configured to absorb a radio frequency RF signal emitted from an RF tag in the refrigerator;
a plurality of reading components disposed in the refrigerator and configured to receive an RF signal passing through the wave absorbing component;
an intensity detecting module configured to detect an intensity of the RF signal received by each of the plurality of reading components; and
a positioning module configured to determine a location of the RF tag according to intensity of the RF signal received by each of the plurality of reading components.

* * * * *